United States Patent
Baratta et al.

(10) Patent No.: US 6,945,608 B2
(45) Date of Patent: Sep. 20, 2005

(54) POWER TAKE OFF ASSEMBLY, DRIVE ASSEMBLY AND SAW USING POWER TAKE OFF ASSEMBLY

(75) Inventors: Anthony Baratta, Oak Park, CA (US); Stan Peterson, Kansas City, MO (US); Luciano Cuevas, Sylmar, CA (US); Matt Farris, Palmdale, CA (US)

(73) Assignee: Electrolux Professional Outdoor Products, Inc., Cleveland, OH (US)

( * ) Notice: Subject to any disclaimer, the term of this patent is extended or adjusted under 35 U.S.C. 154(b) by 40 days.

(21) Appl. No.: 10/100,502

(22) Filed: Mar. 18, 2002

(65) Prior Publication Data

US 2003/0173820 A1 Sep. 18, 2003

(51) Int. Cl.[7] ................................................. B28D 1/04
(52) U.S. Cl. ........................ 299/39.3; 403/26; 464/182
(58) Field of Search .............................. 299/39.3, 36.1; 464/182; 403/26

(56) References Cited

U.S. PATENT DOCUMENTS

| | | | |
|---|---|---|---|
| 1,959,871 A | | 4/1934 | Liggett |
| 4,068,907 A | * | 1/1978 | Zenthoefer .................. 384/417 |
| 4,787,678 A | | 11/1988 | Holmes et al. |
| 5,224,823 A | | 7/1993 | Cordts |
| 5,564,408 A | | 10/1996 | Bassols |
| 5,573,379 A | * | 11/1996 | Kimura et al. ........... 417/222.2 |
| 5,810,448 A | | 9/1998 | Kingsley et al. |
| 5,950,612 A | | 9/1999 | Zuzelo et al. |
| 6,019,433 A | * | 2/2000 | Allen ........................ 299/39.3 |

OTHER PUBLICATIONS

Oberg, et al. "Machinery's Handbook" p. 2126.*

* cited by examiner

*Primary Examiner*—John Kreck
(74) *Attorney, Agent, or Firm*—Henricks, Slavin & Holmes LLP

(57) ABSTRACT

A power takeoff assembly, a drive assembly, a saw and a kit for a saw include a drive plate and drive shaft, for example for mounting to a fly wheel, and a bell housing for mounting to an engine block and for supporting a sheave. The sheave rotates on bearings supported by a housing tube on the bell housing, and a coupler couples the drive shaft, which extends into the tube, to the sheave. Side loading and cyclical loading on the drive shaft are reduced, dimensions of the saw can be reduced and operation of the saw can be more reliable.

57 Claims, 11 Drawing Sheets

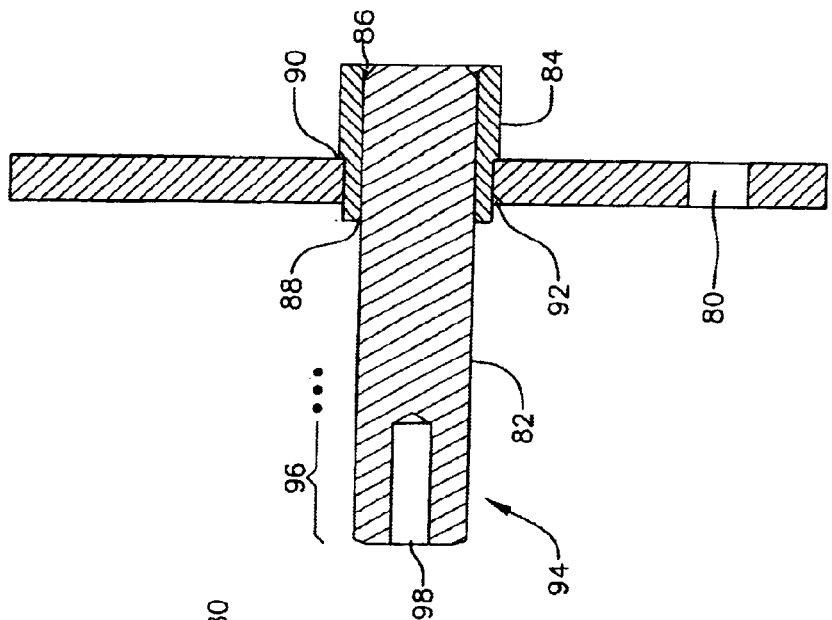
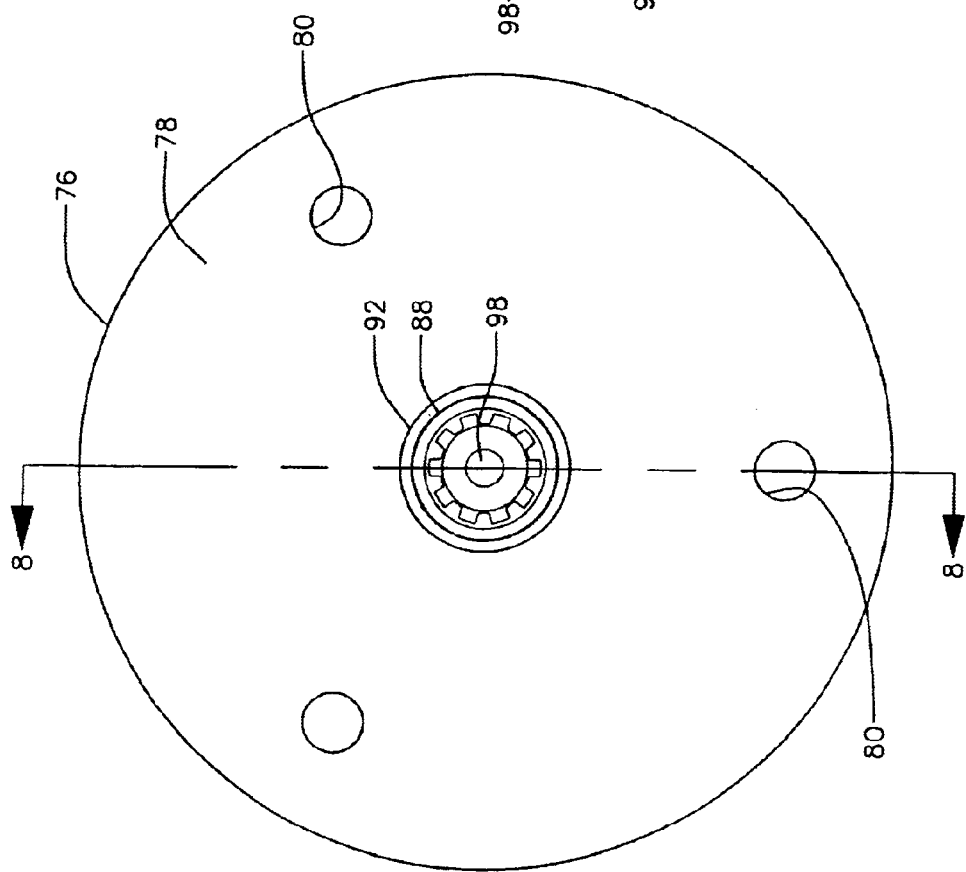

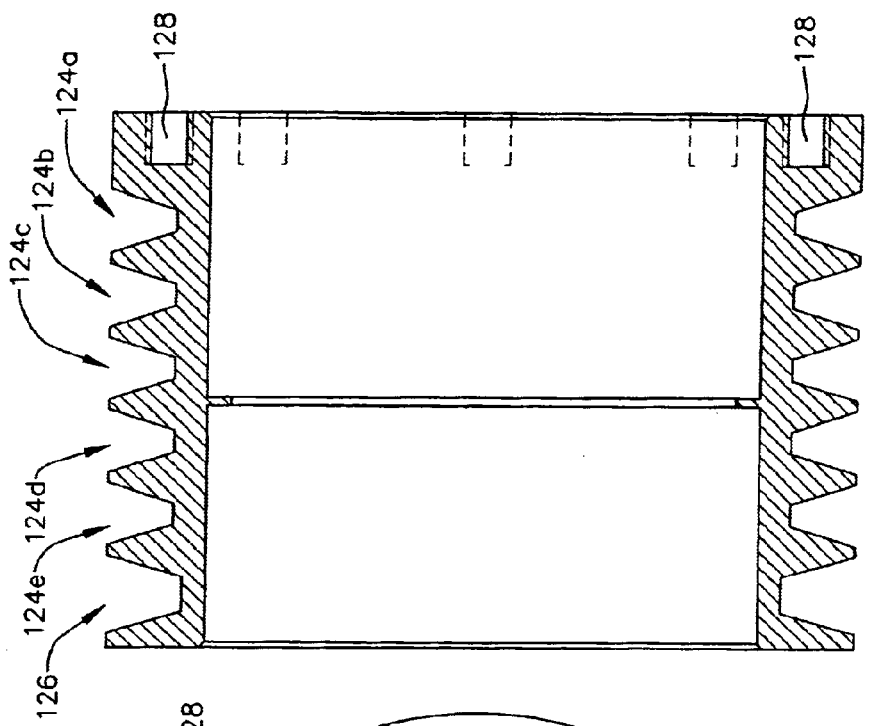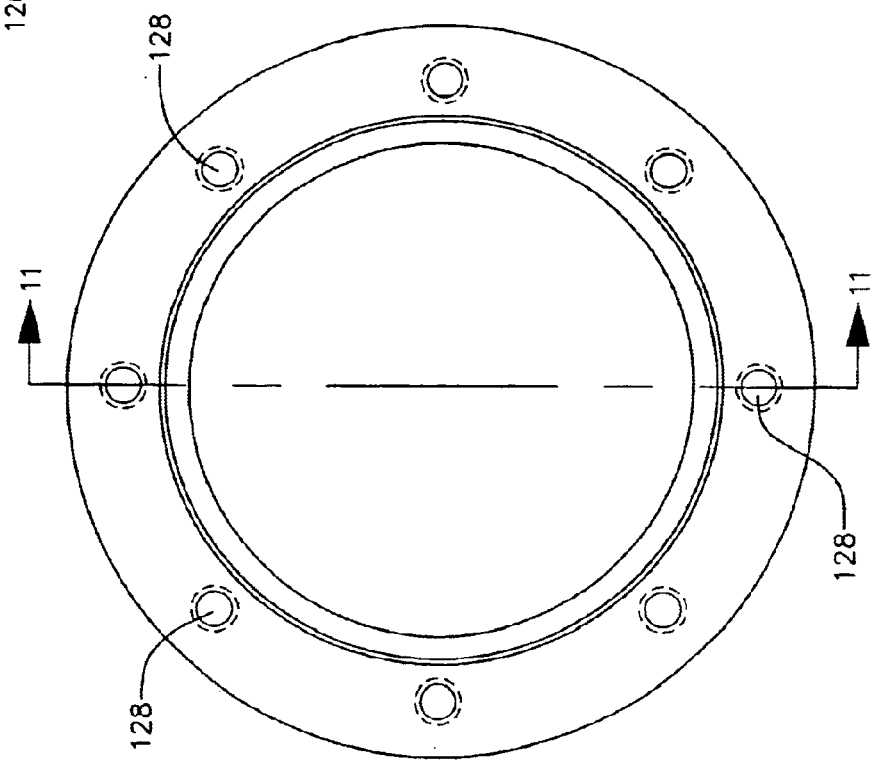

POWER TAKE OFF ASSEMBLY, DRIVE ASSEMBLY AND SAW USING POWER TAKE OFF ASSEMBLY

BACKGROUND OF THE INVENTIONS

1. Field of the Invention

This relates to power take off assemblies, and saws using power take off assemblies, for example concrete and slab saws and self propelled saws.

2. Related Art

Power saws typically include a motor, engine or other system for producing drive power, a saw blade or other cutting device and a support frame structure for supporting the engine and cutting blade. The power system may be an internal combustion engine, a hydraulic motor, an electric motor or the like. The power system can drive the cutting blade through a mechanical or hydraulic drive system, but a belt drive system is common. The size and dimensions of the saw will vary according to usage and application.

For large projects, higher horsepower levels are desired for the saw. Higher horsepower allows the use of larger cutting blades, reduces cutting time and may provide higher cutting speeds. However, higher horsepower levels usually mean larger engines and often larger saw dimensions. Larger saws may also mean less maneuver ability.

In some applications, structures may be such that access to an area for cutting may be limited. For example, in high-rise buildings, concrete floors and/or walls may be poured or installed on an ongoing basis, and detail work may come later. Access openings such as door ways, floor openings, and the like, as well as concrete openings for fixtures may be formed after concrete slabs and walls are poured and the concrete hardened. Similar work may also be done on other concrete projects after the concrete has hardened. However, the equipment to be used for cutting in those areas may be limited by such restrictions as access opening size, elevator size and the like. For example, door ways in buildings may be 32 inches in width, thereby limiting the width of the saw to less than 32 inches. Therefore, the amount of horsepower for a saw and other operating characteristics such as blade size and the like may be limited for a given application by such factors as access opening size and the like.

Increasing the horsepower for a saw often results in a larger saw. The consequences of a larger saw may be most noticeable where the saw engine is oriented sideways relative to the forward direction of motion of the saw. In these saws, the engine crank shaft and the stub shaft attached to it extend sideways from the engine, and one or more drive belts couple the stub shaft sheave to a sheave for driving a saw blade shaft. If the engine is made larger, the width of the engine with the stub shaft typically increases, which may make the saw less maneuverable. Therefore, saw improvements may have undesirable consequences for some users.

In saws with a belt drive for the saw blade, the sheave is typically mounted to and held on the stub shaft using a shaft key fitting into a longitudinal groove in the stub shaft and a corresponding groove in an internal surface of the sheave. The stub shaft, key and sheave are subjected to side loading by the belts during normal operation. The side loading and the rotation in turn produces a cyclical fatigue load on the stub shaft, often focused in the area of the shaft key. Such loads sometimes produce fatigue and sometimes fractures in the shaft, leading to drive failure. Increasing the saw horsepower produces more cyclical fatigue loads on the shaft and may increase the likelihood of shaft failure.

SUMMARY OF THE INVENTIONS

Apparatus and methods are described for providing a saw with a smaller profile. A saw and method of operation are also provided that would allow a higher horsepower engine with the same overall saw dimension as conventional saws, or even smaller. A saw and saw operating method are shown that separate the drive function for the saw output and the support function for the saw output, or reducing the load function of the stub shaft so the primary function of the stub shaft is to turn the output sheave. Additionally, a saw and operating method are further described that reduces cyclical fatigue on the rotating shaft, and that may also reduce load placed on the engine crank shaft. Engine operation and performance can be improved and made more reliable, engine horsepower can be increased without adversely affecting the overall size of the saw, and in some cases, the saw size can be reduced.

In one example of an assembly described herein, a power takeoff assembly includes a drive element, in one example a stub shaft, for rotation with a rotating element. A stationary support supports an output element. The output element rotates with the drive element, for example while being supported by the stationary support. With such an arrangement, load on the rotating element can be reduced and applied more to the stationary support, and the loading is preferably fixed and non-movable for example when the output element is positioned on the stationary support. In such a configuration, the load bearing function and the drive function can be separated. In one example, the drive element may be a stub shaft attached to a fly wheel of an engine extending into a bearing supporting shaft mounted to an engine housing, and the output element rotates on the bearings. The output element can be coupled to the stub shaft through a coupling element. The output element is supported by the shaft mounted on engine housing, and is driven about the shaft by the stub shaft through the coupling element.

In another example of a power takeoff assembly, a drive element rotates with a rotating element and a stationary support supports an output element that rotates with the drive element. The drive element and the stationary support preferably extend in the same direction, and in one preferred form they are co-axial. For example, the drive element can be a stub shaft and stationary support can be a hollow shaft supported by the engine housing with the stub shaft extending through the hollow shaft. The output element rotates on bearings on the hollow shaft and is driven by the stub shaft through a coupling element.

In a further example described herein, a drive assembly and method has a rotating drive and a stationary support. An output element is supported by the stationary support and coupled to the rotatable drive so as to rotate about the stationary support. The output element also includes surfaces for receiving a flexible element to be driven by the output element. The drive assembly separates the drive function for the output element and the support function for the output element so the drive assembly is more reliable. In one example, the rotating drive can be a drive shaft such as a stub shaft and may be mounted to an engine fly wheel through a removable drive plate. The drive shaft can include splines for engaging a coupling element which in turn engages the output element. The stationary support in one example includes a hollow shaft into which the drive shaft extends and engages with the coupling element. The stationary support is preferably mounted to a housing or other stationary support structure so as to reliably support the output element. In the context of an engine, the housing may be the engine block, and the stationary support can be the hollow shaft mounted, fixed or otherwise supported by a fly wheel cover. In another example of a drive assembly and method, the drive assembly may be used for driving a saw blade or other cutting device. The output element may include one or more surfaces for receiving drive belts, which are then run around an input sheave for the saw blade.

In an additional example of a method and apparatus described herein, a saw includes an engine with a rotatable output shaft and a support stationary relative to the engine. An output element is supported by the stationary support and rotates with the rotatable output shaft. A cutting blade is driven by the output element, for example through one or more drive belts or the like. In one such example, the stationary support can be a support shaft and the support shaft can be mounted to the engine block, or another portion of a stationary structure can be used to support the support shaft. The output element may be a sheave turning on bearings on the support shaft.

In one method of providing a drive assembly, a rotating drive can drive an output element supported by a rotationally fixed support. The output element is then rotated by the rotating drive, which rotation is transferred to a work piece such as through drive belts or the like. The output element thereby rotates on a structure other than the rotating drive, thereby allowing the load on the output element to be supported by the fixed support rather than being applied to the rotating drive. This drive method can be used as a power takeoff, for example on saws, cutting devices and other apparatus.

In another example of apparatus, a kit may be provided for assembling a power takeoff assembly onto a structure such as an engine, a saw or other machine. The kit may include an output support for supporting a rotatable output device, for example a sheave, and a coupling element for coupling the output device to a rotatable element, for example a stub shaft. The kit may also include the stub shaft itself, especially where the stub shaft may have engagement surfaces, such as for receiving the coupling element, different from the stub shaft on the original equipment. In one example, the output support is a hollow shaft into which the stub shaft extends. The output support can include a mounting plate, web or other mounting structure for mounting the output support to a non-rotatable structure, for example an engine block. The output support preferably includes bearings between the support and the output device so that the output device can rotate freely about the support once assembled.

These and other structures and methods are described further in the following detailed description, with reference to the drawings, a brief description of which follows.

BRIEF DESCRIPTION OF THE DRAWINGS

FIG. 7 is a front elevation view of the drive assembly of FIG. 6.

FIG. 8 is a transverse section of the drive assembly take along line 7—7 of FIG. 7.

FIG. 10 is a front elevation view of an output element in the form of a sheave for use with the power takeoff assembly of FIG. 4.

FIG. 11 is a transverse section of the output element of FIG. 10 taken along line 11—11.

DETAILED DESCRIPTION OF THE PREFERRED EMBODIMENTS

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

Mechanical drives and power takeoff assemblies find applications in a number of areas. For the present descriptions, examples of power takeoff assemblies will be given in the context of flat saws or concrete slab saws such as those used to cut pavement, concrete in buildings and other structures, and the like. However, it should be understood that the inventions are not limited to the examples, and can be extended and are applicable to other methods and apparatus as well.

Figure 1:
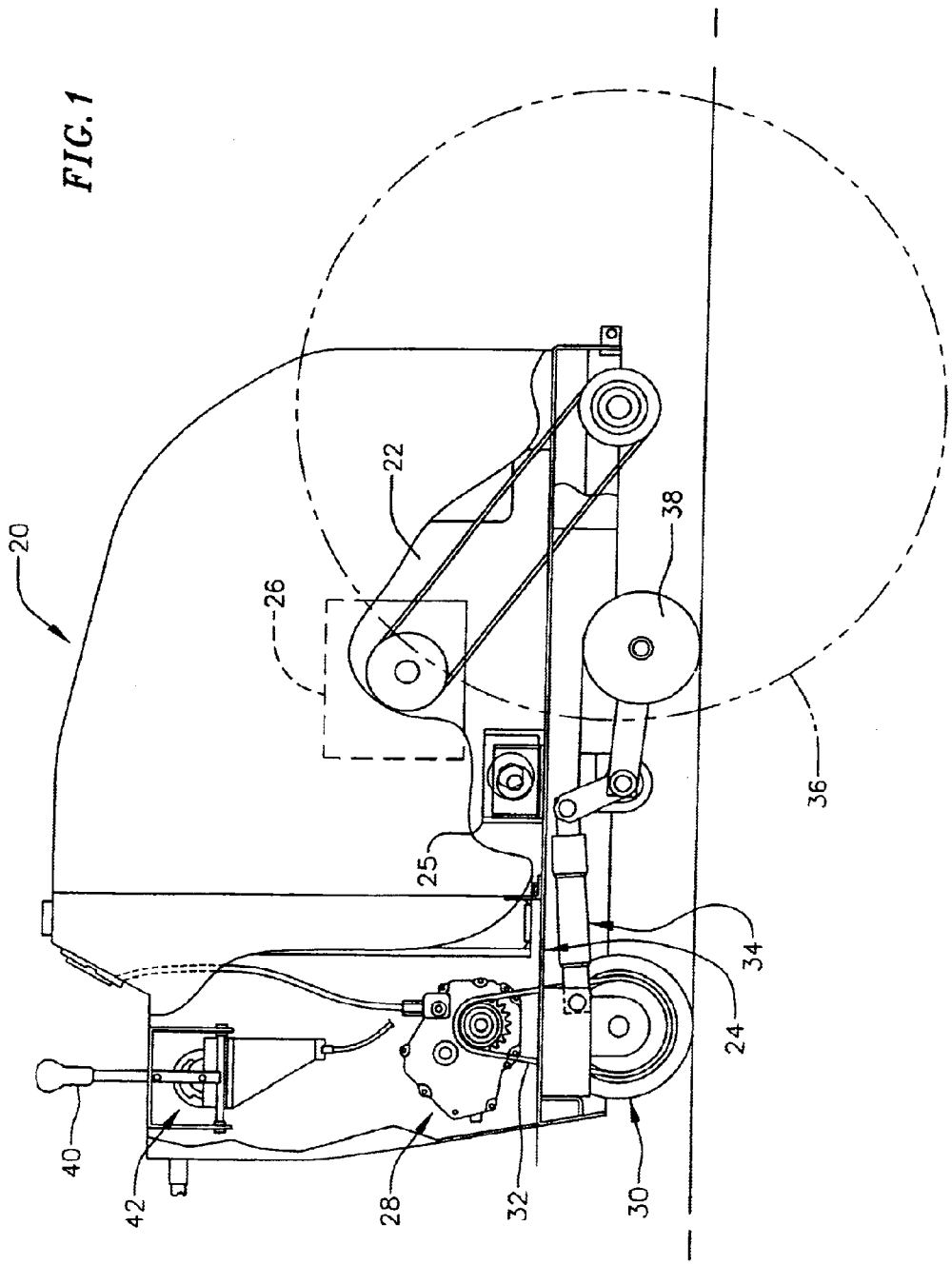
FIG. 1 is a side elevation and partial cutaway view of a machine with a power takeoff assembly, in the form of a slab saw such as that with which the apparatus described herein can be used.
Figure 2:
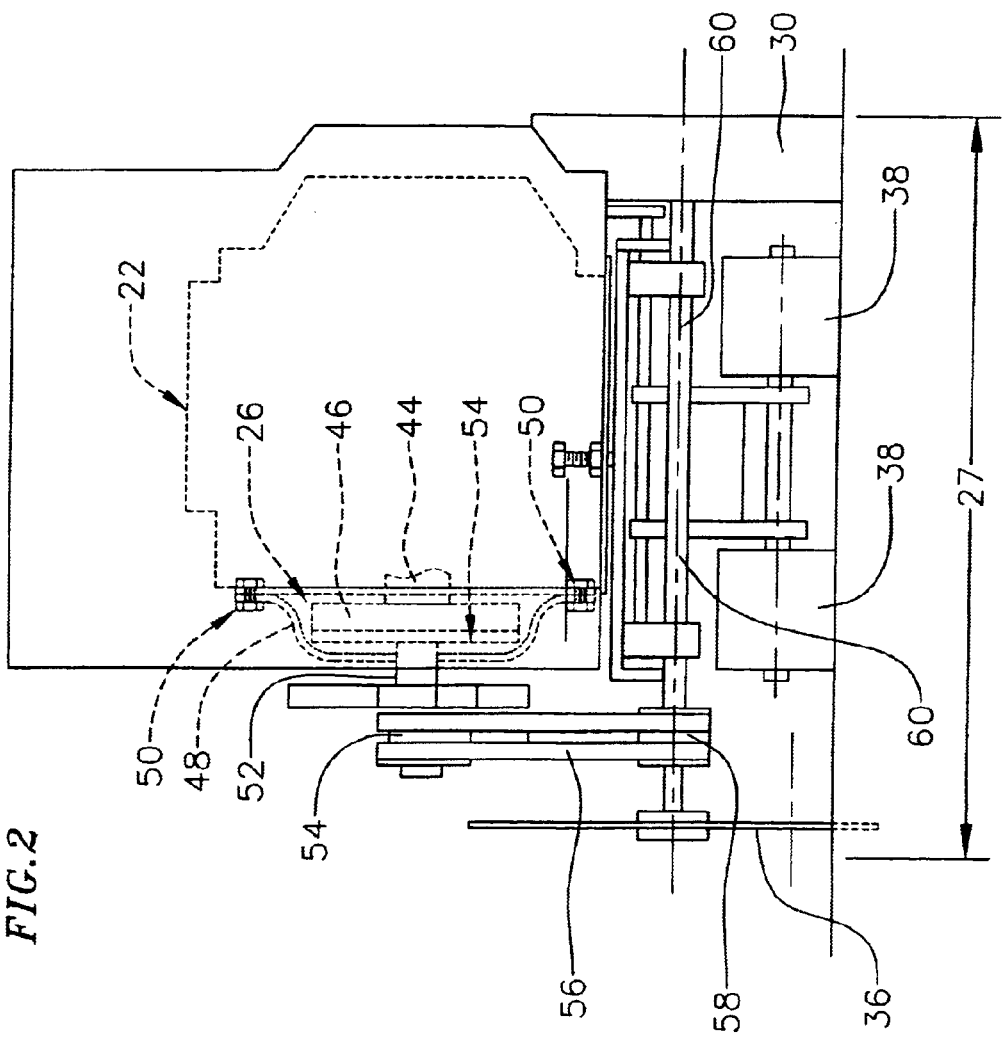
FIG. 2 is a front elevation view and partial schematic of the saw of FIG. 1.
Figure 2A:
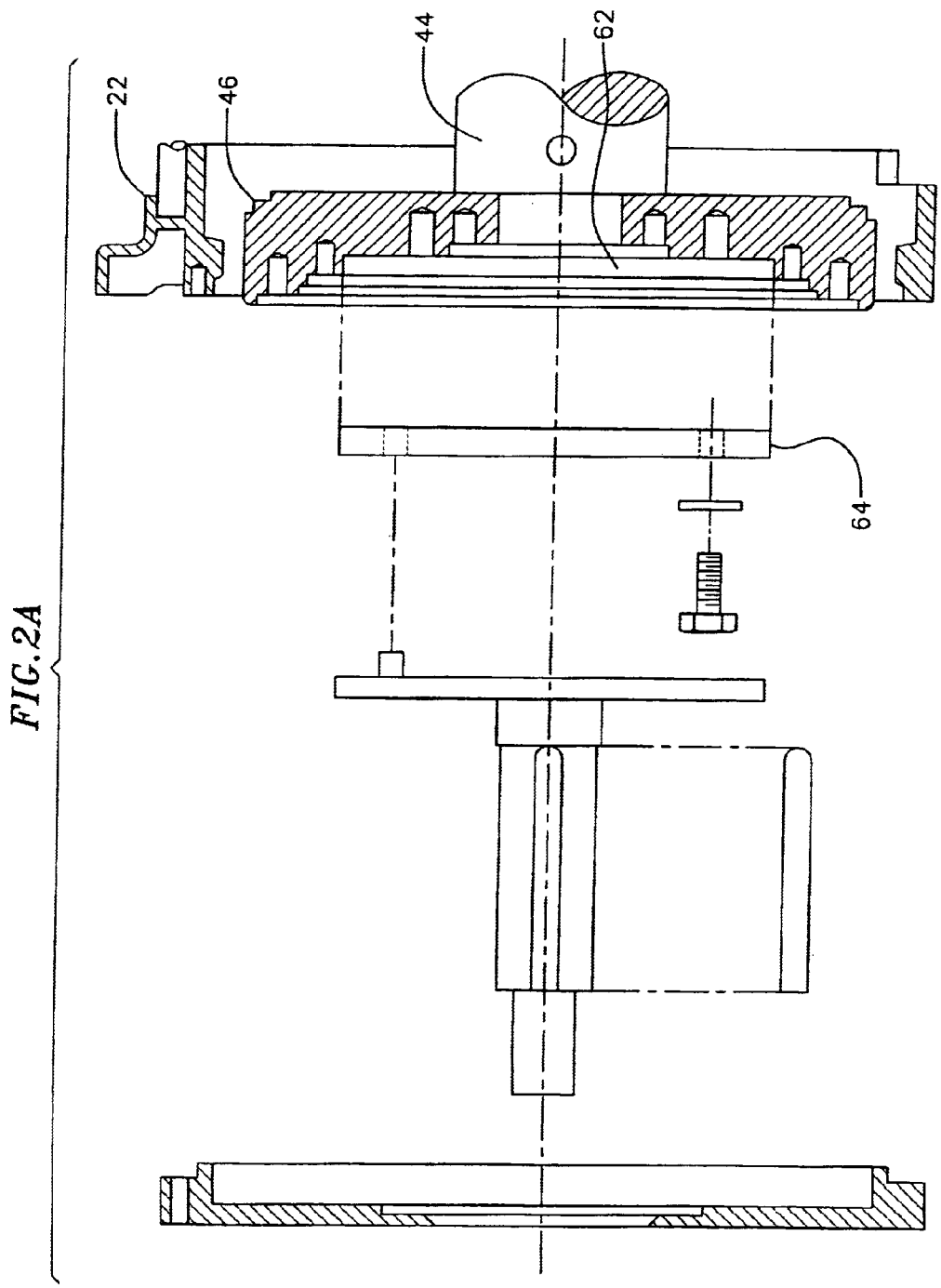
FIG. 2A is a detail cutaway of the fly wheel assembly of FIG. 2.

Concrete saws with which the present inventions can be used include flat or slab saws such as 20 shown in FIGS. 1 and 2. The saw includes an engine 22 mounted to and extending along the width-wise axis of a saw frame 24. The engine 22 is reliably mounted to and supported by the frame 24 through an engine mount 25 or other mounting means. The drive end of the engine crank shaft is coupled to a drive plate assembly 26 so that the rotational motion of the crank shaft can be transferred to the drive plate assembly 26. In the example of the saw shown in FIGS. 1 and 2, the engine is mounted transversely of the frame allowing a substantially direct drive between the engine crank shaft and a pulley used for driving the saw blade. For transversely mounted engines, changes in engine design may affect how the saw is used. In an example where the engine size is increased for greater horsepower, the length of the engine and therefore the width 27 (FIG. 2) of the saw may increase significantly, even to the point where the saw may no longer fit through a standard 32 in. wide doorway. Therefore, practical limitations may otherwise preclude desirable improvements to saws. However, improved designs such as those described here may nonetheless allow improvements to the engine without significantly affecting how and where the saw can be used. Additionally, retrofit of existing saws using apparatus described herein may allow those saws to have a narrower width than presently exists.

A transmission 28 is mounted at a rear portion of the frame 24 for engaging and driving wheels 30 through a chain or other drive link 32. A blade depth control mechanism 34 is mounted on the lower side of the frame 24 to control the depth of cut by the saw blade 36. Rollers 38 support and help to control the depth of cut of the blade as they rest on the work surface. The work surface may be concrete or other pavement or floor, or any other work surface. A control handle 40 and control handle linkage 42 control a Hydrostatic pump, the transmission 28 and the depth control assembly 34.

In some conventional saws, as with many other types of motor-driven the equipment, the motor crank shaft 44 (FIG. 2) extends from the engine 22 and turns a fly wheel 46. In the embodiment of the saw shown in FIG. 2, the fly wheel is enclosed within a bell housing or cover plate 48 mounted to the engine block through fasteners 50, two of which are shown in phantom in FIG. 2. A conventional stub shaft 52 is mounted to the fly wheel 46 through a drive plate 54 using appropriate fasteners, as is known to those skilled in the art. The stub shaft 52 extends through the cover plate 48 through bearings (not shown). A sheave 54 is mounted to and supported by the stub shaft 52 and is fixed to the stub shaft by a key and set screw or other fastener, as is also known to those skilled in the art. The sheave 54 may include a number of grooves or other surfaces for receiving one or more belts 56 for driving a blade pulley 58 mounted to a blade shaft 60. The blade shaft 60 is mounted and supported relative to the frame in a conventional manner.

Considering the fly wheel in more detail, the fly wheel 46 is mounted to crank shaft 44 within the housing defined by the engine block 22. The fly wheel is mounted to the engine crank shaft 44 by conventional means. The side of the fly wheel opposite crank shaft includes a number of pockets, recesses or seats into which parts of a power takeoff assembly are mounted. Specifically, an inner seat 62 receives a power takeoff drive disk 64 held in place by one or more fasteners. A drive shaft is then mounted and fixed to the drive disk 64 through one or more fasteners. Other means may also be provided for mounting and supporting a drive shaft relative to the crank shaft 44.

In operation, the engine may be started with the blade raised so that the crank shaft 44 then turns the fly wheel to rotate the sheave 54. The sheave 54 drives belts 56 which in turn rotates the blade shaft 60 turning blade 36. The blade is brought down into contact with the work surface and a groove cut into the work surface.

In one example of one aspect of the present inventions, a power takeoff assembly 66 (FIG. 4) can be used on an engine such as a saw or other equipment on which such assemblies are used, for example to form part of a drive assembly such as for driving a saw blade. For present purposes, the power takeoff assembly in the present example will be described for use on a slab saw or flat saw such as that described with respect to FIGS. 1 and 2, but it is understood that the assembly can be used on structures other than saws. Additionally, fewer than all of the features of the power takeoff assembly 66 described herein as an example may be used on the equipment while still achieving at least one of the benefits of the assembly, even though one or more features are omitted. Fewer than all of the components can still be used to achieve some of the benefits of the inventions.

The power takeoff assembly 66 preferably includes a drive element 68, a stationary support 70 and an output element 72. In one preferred form, the drive element 68 moves with the motion of the engine, which in the present case is rotational motion, while support 70 is stationary relative to the engine by being mounted to the engine. Alternatively, the support for the output element 72 can also be moving, but possibly slower than the drive element 68. One benefit of having the support for the output element 72 separate from the drive element 68 is that the output element would not be applying the same load and forces to the drive element 68 compared to the loads and forces experienced by conventional stub shafts. However, a preferred configuration is to have the support 70 stationary relative to the engine while allowing the drive element to move freely with the drive of the engine.

The power takeoff assembly also preferably includes a coupler or coupling element coupled between the drive element 68 and the output element 72. The coupling element 74 can take a number of forms, and preferably transfers the drive motion from the drive element 68 to the output element 72.

Considering the drive element 68 in more detail (FIGS. 3–8), the drive element 68 includes a mounting element 76. The mounting element 76 mounts the drive element 68 to the engine or other power source. The mounting element 76 in the form described herein is a plate 78 having a configuration similar to a conventional power takeoff drive plate and includes one or more openings 80 for receiving fasteners to mount the drive plate onto the fly wheel of a saw engine. The mounting element 76 can take any number of forms, but is generally configured to complement the drive structure to which it is mounted.

The drive element 68 also preferably includes a drive shaft 82. The drive shaft 82 transmits the drive motion of the engine to the output element 72. In the present example, the drive shaft 82 is preferably splined to more reliably transmit the drive motion of the engine to the coupler 74. The drive shaft 82 is mounted to the drive plate 78 through a spline drive 84. The spline drive 84 includes complementary internal splined surfaces for receiving the splined drive shaft 82, and the two components are preferably welded to each other on each side of the drive plate 78 about the circumference 86 and 88, respectively, of the drive shaft 82. The spline drive 84 fits into a similar-sized opening in the drive plate 78 and is preferably welded on each side of the drive plate around the circumference 90 and 92, respectively, of the spline drive 84.

The drive shaft 82 includes an end portion 94 opposite the spline drive 84. The end portion 94 is also splined and forms an engagement surface 96. The engagement surface 96 is used in this example to engage the coupler for transferring the rotating engine motion to the output element 72. The longitudinal or axial extent of the engagement surface is preferably sufficient to reliably engage the coupler 74. The drive shaft 82 also preferably includes a mounting surface such as a threaded opening 98 for receiving a mounting bolt or other fastener (FIG. 4) for mounting the coupler 74 on the drive shaft.

When the drive assembly 68 is mounted to the engine, it will rotate about a central axis 100 (FIG. 3) with rotation of the engine crank shaft. It transfers the engine rotational motion to the coupler 74. As described more fully below, the only significant loading on the drive element 68 results from the counter rotational or resisting force produced by the saw blade as returned through the coupler 74.

Figure 3:
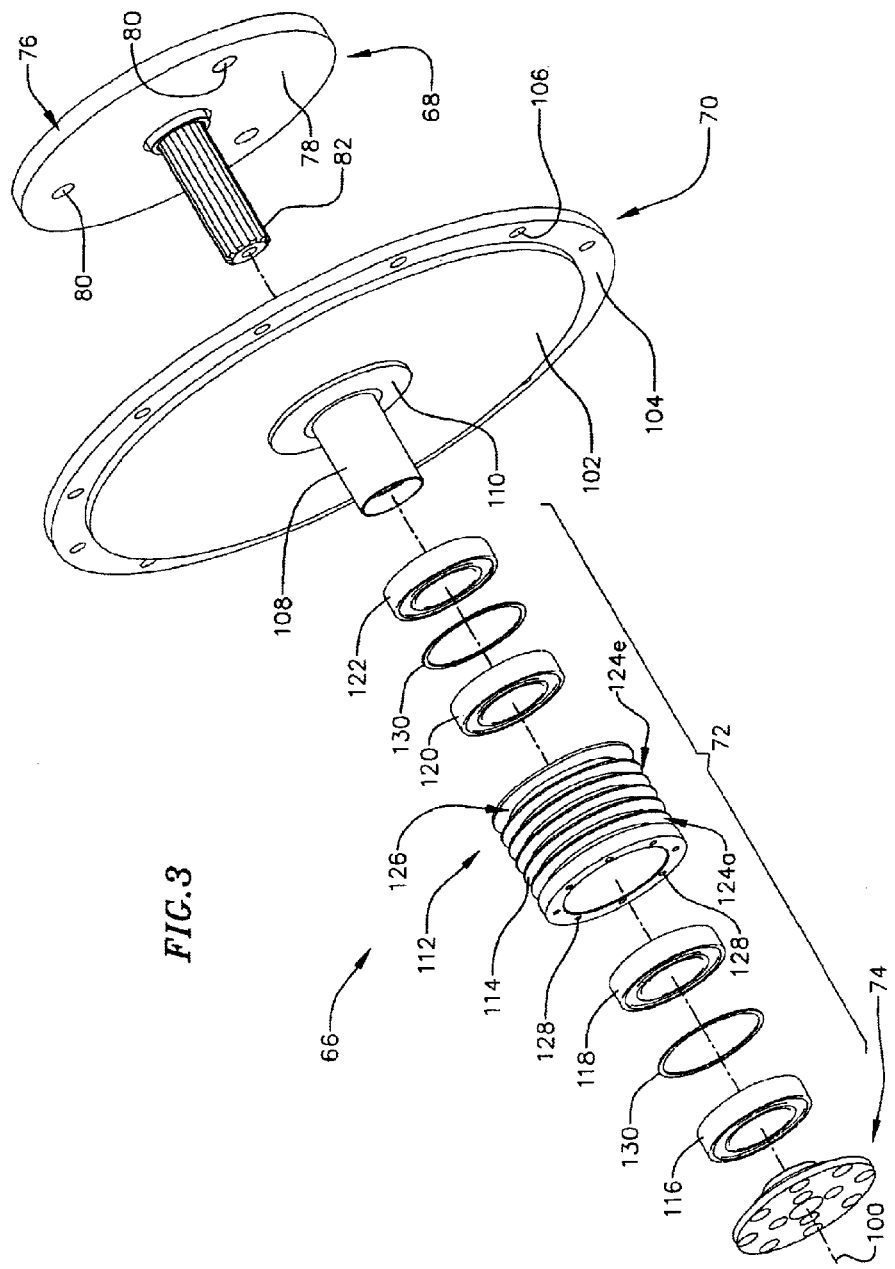
FIG. 3 is a partial exploded view of one example of a power takeoff assembly that can be incorporated on a saw or retrofit onto an existing saw.
Figure 4:
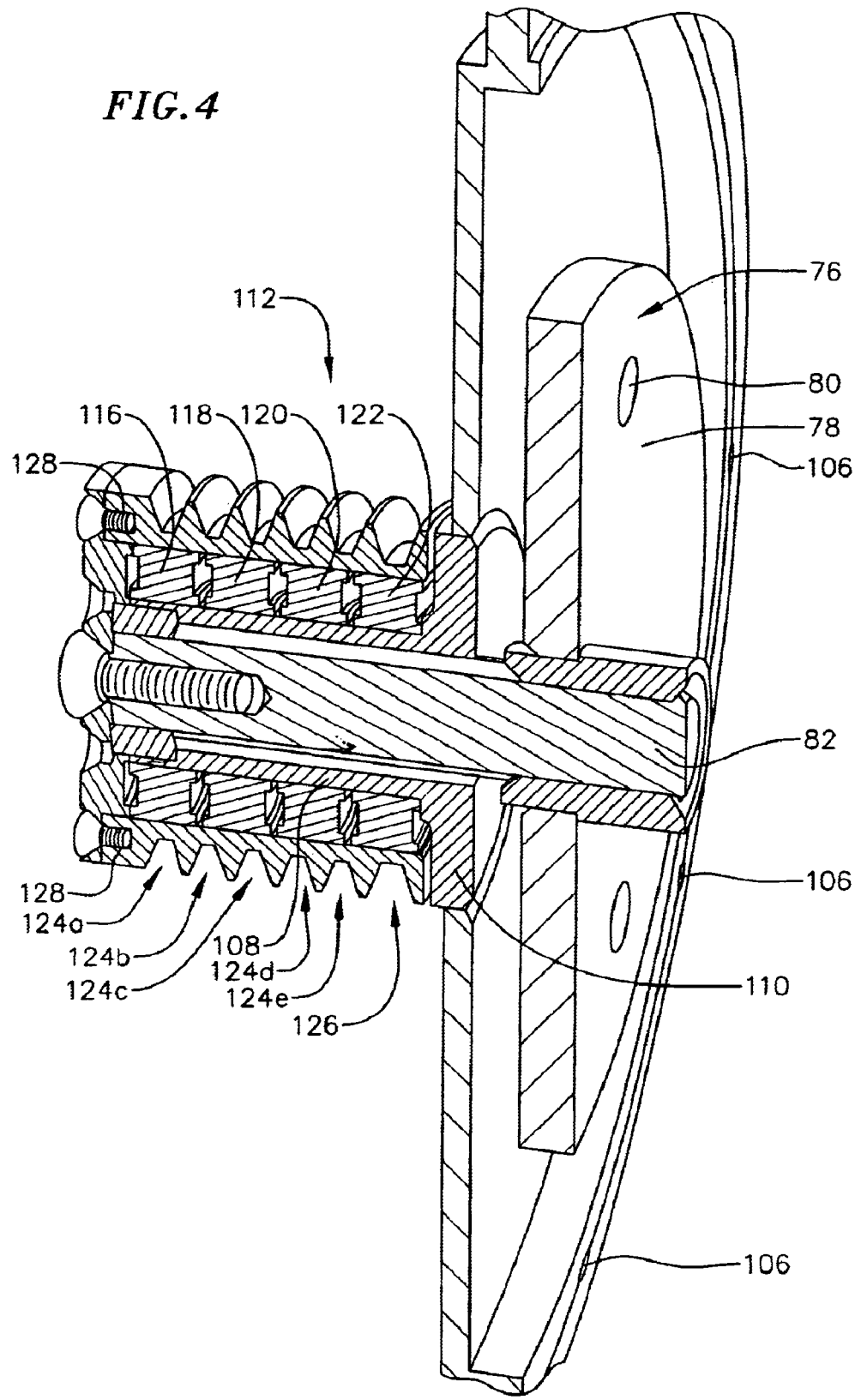
FIG. 4 is a transverse section and isometric view of one example of a power takeoff assembly that can be incorporated on a saw or retrofit onto an existing saw.
Figure 5:
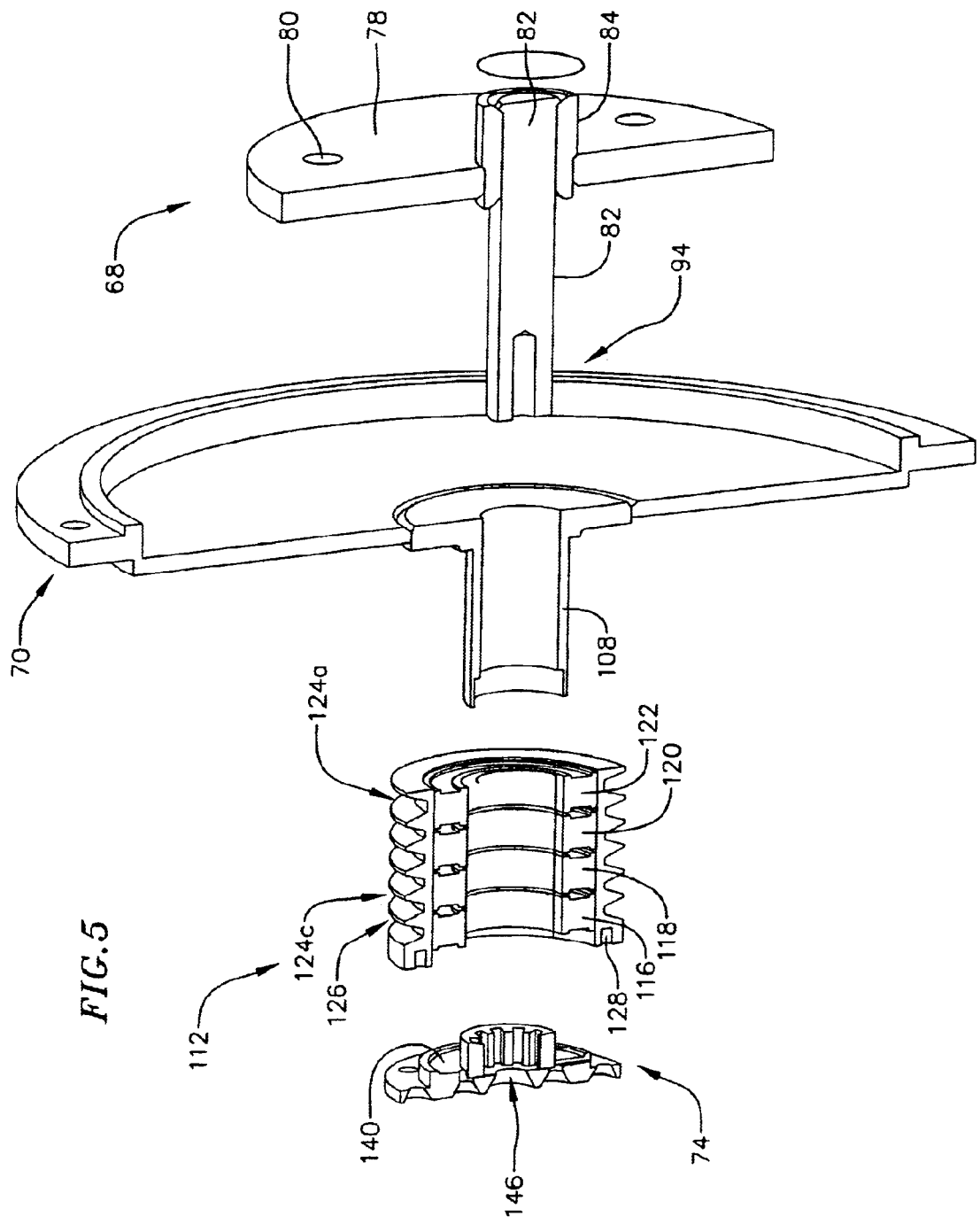
FIG. 5 is a transverse section and partial exploded isometric view of one example of a power takeoff assembly that can be incorporated on a saw or retrofit onto an existing saw.
Figure 6:
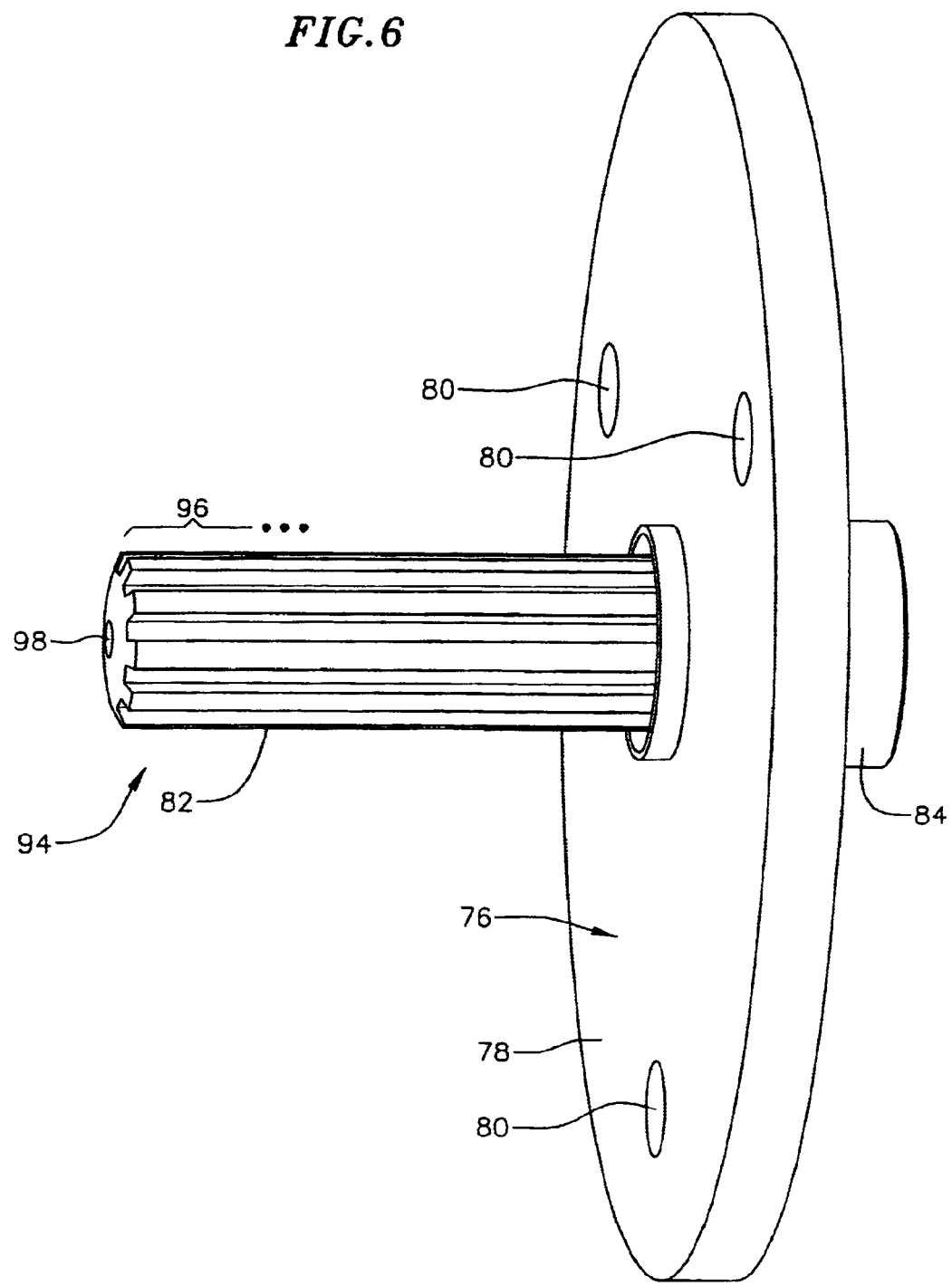
FIG. 6 is an isometric view of a drive assembly for use with the power takeoff assembly of FIG. 4.
Figure 9:
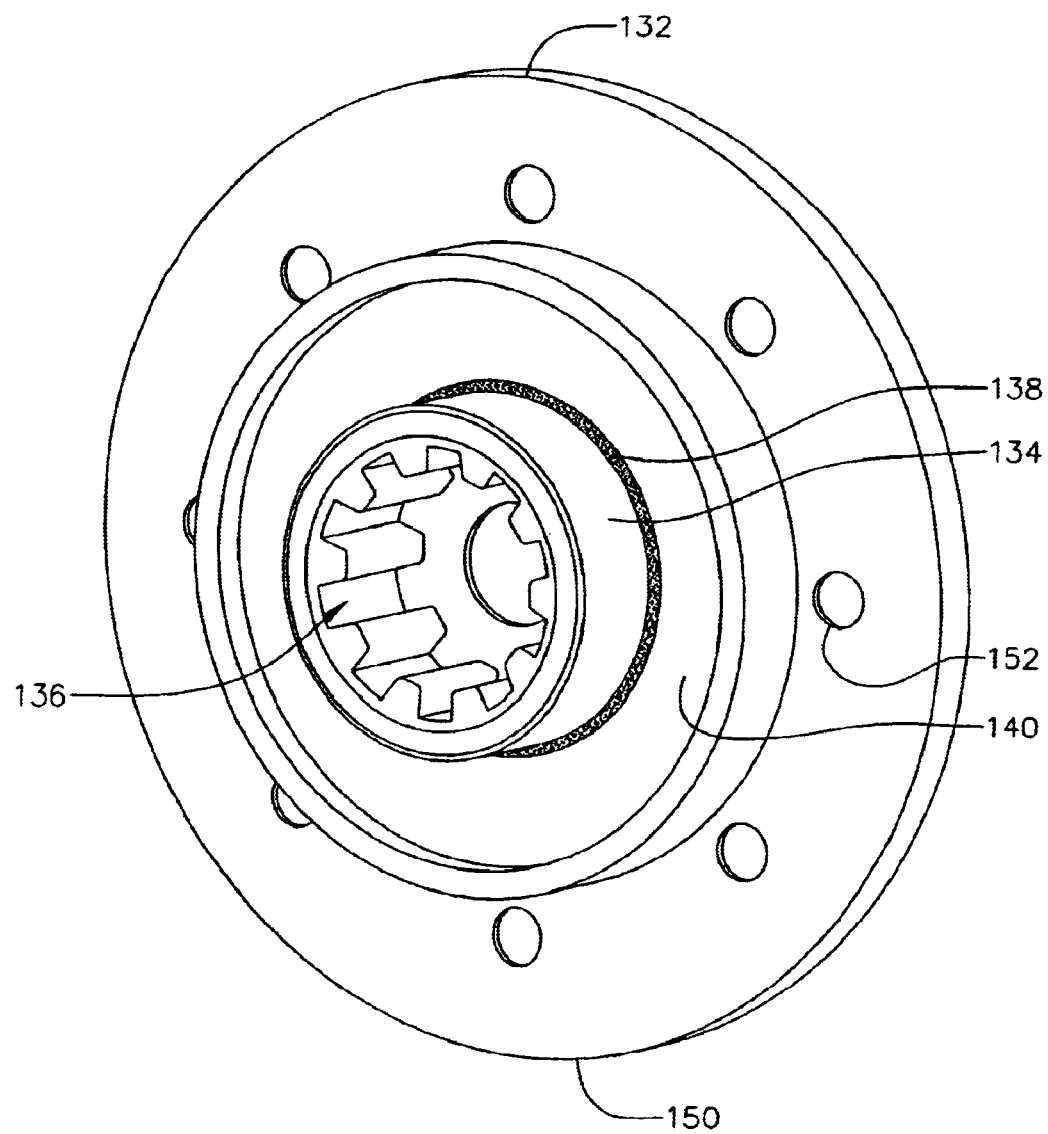
FIG. 9 is an isometric view of a coupling element for use with a power take off assembly of FIG. 4.

The output support 70 (FIGS. 3 and 4) is configured to be stationary relative to the engine or other motion-generating device. The output support in the example shown in FIGS. 3 and 4 is mounted and secured to the bell housing of the engine so as to be stationary relative to the engine. The output support can also be supported by another structure other than that which produces the movement in the drive shaft, including the support frame or structures which are themselves supported by the support frame. Additionally, the output support can also function, though not as well, even if it were rotating on its own and separate from the rotating drive shaft, because the side loading or cyclical loading on the drive shaft would be reduced or still eliminated. However, the preferred configuration is to have the output support stationary relative to the engine producing the rotational movement of the drive shaft.

The output support 70 is preferably in the form of a fly wheel cover with an axially-extending support for an output element, for example output element 72. In the example shown in FIGS. 3 and 4, the output support 70 includes a plate or cover in the form of a bell housing 102 having a flange 104 for mounting the bell housing to the engine block. The flange includes a number of openings 106 for receiving fasteners (not shown). The number of openings is preferably sufficient to securely mount the bell housing to the engine block as well as to maintain stationary the axially-extending support for the output element under normal operating conditions.

The output support 70 includes a preferably hollow cylinder forming a housing tube 108. The housing tube is preferably rigidly mounted, fixed or otherwise supported by the bell housing 102, such as by welding. The housing tube may also include a radially-extending disk 110 to help support the housing tube 108 in the bell housing. The housing tube 108 is preferably a right circular cylinder having a smooth outer surface and smooth inner surface with a counter bore. The outer surface receives and supports an output element, and the tube also receives and houses the drive shaft 82, allowing the drive shaft to freely rotate within the housing tube, preferably with sufficient clearance to provide an air gap between the outer surface of the drive shaft and the inside surface of the housing tube 108. As can be seen in FIG. 4, the drive shaft 82 has a length that when properly positioned within the housing tube 108 extends slightly past the open end of the tube 108. The length of the drive shaft 82 permits access to the drive shaft for the coupler 74. The open end of the housing tube includes a counter bore having an inside diameter slightly larger than an inside diameter of the remainder of the housing tube, also to accommodate a portion of the coupler 74 while leaving an air gap between the housing tube and the coupler.

Mounting arrangements can be used for the housing tube 108 other than a bell housing or plate structure. However, using a structure similar to existing bell housings permits easy retrofit on existing saws and other equipment. Additionally, support surfaces other than a housing tube can be used to support the output element. Surfaces other than a smooth surface on a hollow shaft can be used, but the smooth surface of the housing tube 108 easily supports the output element, as will be apparent from the description set forth below. The support element 70 is preferably configured in the manner shown in FIGS. 3 and 4 for ease of use, its compact size and its simplicity.

The output element 72 in the example shown in FIGS. 3 and 4 is configured to rotate with the drive shaft about the housing tube 108. The output element 72 in this example has the form of a sheave 112 having at least one surface 114 for transmitting the rotation of the sheave to a belt, such as belt 56, extending about the sheave. The sheave is preferably supported by bearings, such as first, second, third and fourth bearings 116–122, respectively, which are in turn supported by the housing tube 108. The bearings can be part of the sheave as an assembly, as represented in FIG. 3, or they can be part of the support formed by the housing tube 108. The sheave preferably includes five grooves 124a–e for receiving respective belts 56 for driving corresponding pulleys 80 on the blade shaft 60 (FIG. 2). A sixth groove 126 may be deeper and larger to accommodate a drive belt for the transmission system on the saw.

The sheave 112 includes engagement surfaces for coupling to the drive element, such as through the coupler 74. In the example shown in FIGS. 3 and 4, the engagement surfaces are threaded openings 128 for receiving screws, bolts or other fasteners (not shown) for securely mounting the coupler 74 on the sheave. Other mounting arrangements can be used. The sheave preferably rotate freely about the housing tube 108, and is properly positioned axially relative to the housing tube 108 through engagement with the coupler 74, as will be apparent from the description below. Other ways for reliably positioning the sheave axially relative to the support 70 can also be used.

The bearings 116–122 preferably extend almost the entire axial length of the interior of the sheave and preferably the entire outside length of the housing tube 108. The bearings provide adequate support for the sheave during normal operation. Adjacent bearings may be separated by shims 130, as would be known to those skilled in the art. The bearings are preferably sealed bearings or other friction-reducing components.

The coupling element or coupler 74 couples the drive shaft 82 to the output element 112. It takes what is in the present example rotational motion from the engine and transfers it to the output element in the form of the sheave 112. The coupler 74 can take any number of configurations. Preferably, it securely engages both the drive shaft 82 and the sheave 112 under normal operating conditions. In the example of the coupler 74 shown in FIGS. 3, 4, 12 and 13, the coupler includes a drive coupler 132 and a spline coupler 134. The drive coupler 132 is rigidly and securely fixed to the spline coupler 134, such as by welding or otherwise. The drive coupler and the spline coupler can also be formed integral with each other or as more than two parts joined together.

The spline coupler 134 includes complimentary spline surfaces 136 for engaging the spline drive shaft 82. As shown in FIG. 4, the spline surfaces 136 engage the engagement portion 96 on the output shaft 82 over a sufficient length to insure reliable transfer of rotational motion from the spline drive shaft 82 to the coupler 74. The spline coupler has an outside dimension slightly smaller than the inside diameter of the counter bore in the housing tube 108 so that the drive shaft 82 and the coupler 74 can freely rotate within the housing tube 108. Additionally, the drive coupler 132, when the coupler 74 is mounted to the drive shaft 82, is spaced sufficiently from the end of housing tube 108 to provide an air gap and minimize any possible frictional engagement.

Figure 13:
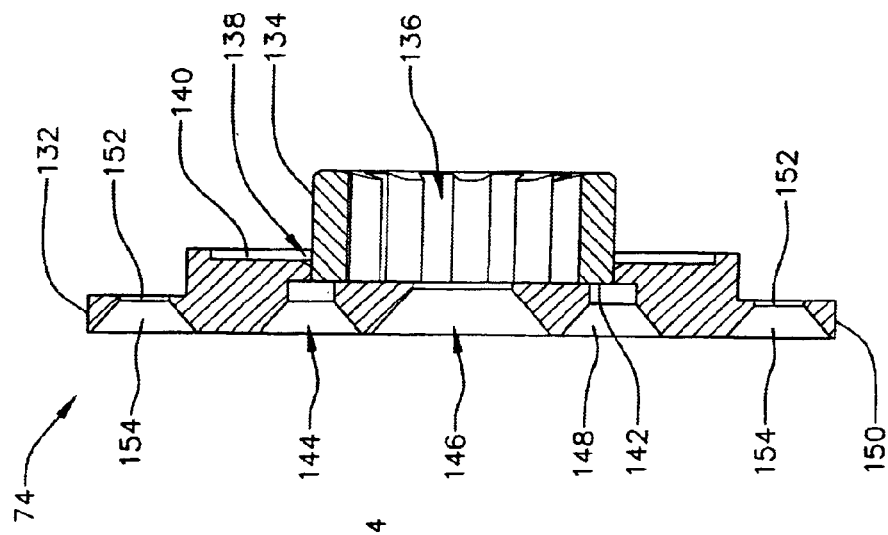
FIG. 13 is a transverse section of the coupling element taken along line 13—13 of FIG. 12.
Figure 12:
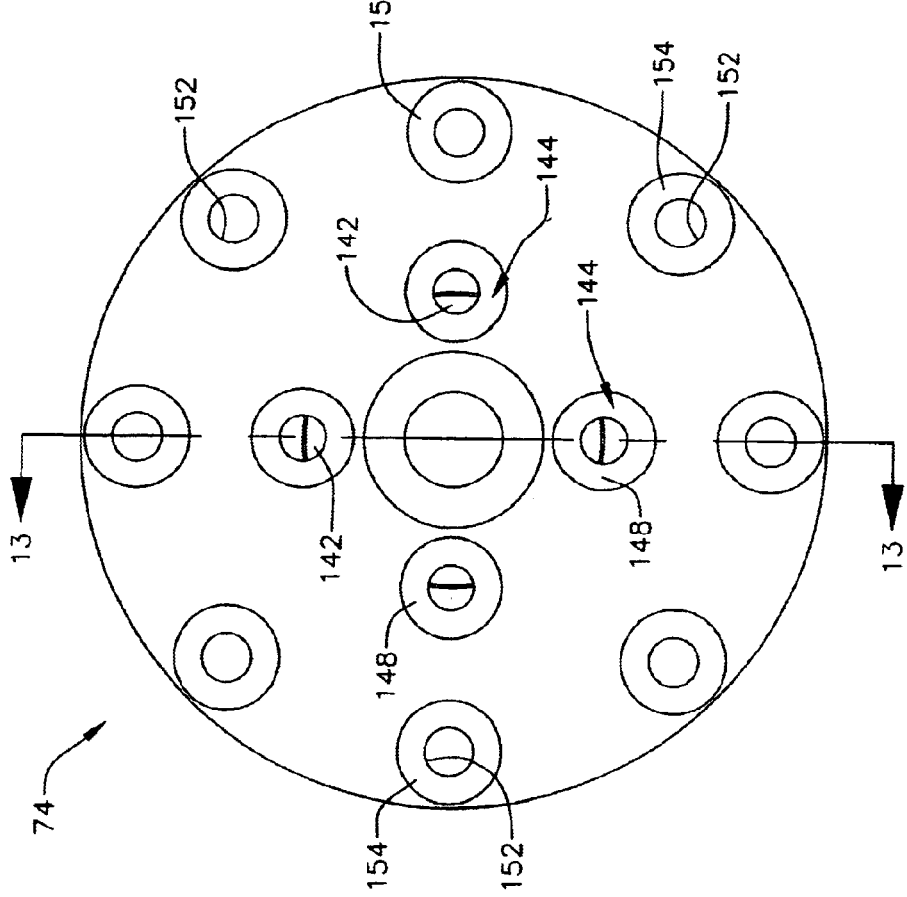
FIG. 12 is a front elevation view of the coupling element of FIG. 8.

The coupler 74 is preferably formed strong enough to withstand the stresses and forces applied to it during normal operation, especially the sheer forces applied through rotation of the drive shaft 82 and the counter forces developed in the sheave 112. In the example of the coupler 74 shown in FIGS. 12 and 13, the coupler is formed from two parts, but other configurations are possible. In that example, the spline coupler 134 is welded to the drive coupler 132 about the circumferential wall 138 of the spline coupler in a recess 140 formed in the back of the drive coupler. A weld is preferably formed about the entire circumference of the spline coupler. The base 142 of the spline coupler is also preferably welded to the drive coupler 132 through one or more openings formed through the front of the drive coupler. In the example shown in FIG. 12, two pair of holes 144 are formed in the front of the drive coupler outside of a central opening 146, where each pair is positioned on a diameter of the drive coupler and perpendicular to a diameter on which the other pair is formed. Each hole is preferably formed with a counter sink surface 148, and each of the four openings in the example shown in FIGS. 12 and 13 are filled with weld material. Additional welds may also be used or other attachment methods may be used. Additionally, the opening 146 receives a bolt or other fastener (not shown) for securely mounting the coupler 74 onto the drive shaft 82.

The drive coupler 132 includes a mounting flange 150 having a thickness approximately half the overall thickness of the drive coupler. The mounting flange 150 mounts the coupler 74 onto the sheave 112. The mounting flange engages the sheave and transmits the rotational motion of the drive shaft 82 to rotational motion of the sheave 112. In the example shown in FIGS. 12 and 13, the mounting flange includes engagement surfaces in the form of fastener openings 152, each of which is preferably formed with a counter sink surface 154 for receiving the head of an appropriate fastener threaded or otherwise set into the corresponding engagement surfaces in the form of threaded openings 128 in the sheave 112. Other methods of engaging the coupler with the sheave are also possible. The engagement surfaces in the form of splines 136 on the coupler 74, and the mounting flange 150 with the fastener openings 152, together couple the rotating drive shaft 82 to the sheave 112.

FIG. 3 shows various components that can be used to assemble a power takeoff assembly or drive assembly for such things as engines, saws for example slab and other concrete saws, and other devices. FIG. 4 shows parts assembled into such a power takeoff assembly or drive assembly, and a form of the assembly that may be supplied in kit form. To assemble the components, for example onto a saw, drive assembly 68 is mounted onto the fly wheel 46 through fasteners. The bell housing and support shaft forming the support element 70 are then mounted to the engine block. The housing tube 108 and drive shaft 82 are dimensioned in such a way as to leave an air gap between them when the shaft extends within the tube and leaving sufficient clearance during normal operation to minimize the possibility of contact between the drive shaft and the tube. The bearings 116–120 are placed over the housing tube 108, if they were not previously installed on the tube, and the sheave 112 slipped over the bearings. The coupler can already be mounted to the sheave, or the coupler can be fastened to the sheave after the sheave is placed over the bearings, and the coupler 74 securely mounted to the drive shaft 82 through a fastener. Alternatively, the support element 70, bearings, sheave and coupler can be pre-assembled and installed after the drive element 68 is mounted. Appropriate belts 56 and a transmission drive belt can then be placed on the sheave and appropriate pulleys for operation.

The assembly of the foregoing example may reduce and even entirely eliminate side loading and cyclical loading on the drive shaft, and therefore on the engine crank shaft. Consequently, the drive shaft is more reliable and has an increased life span. Additionally, the overall spacing from the fly wheel to the outer surface of coupler may sometimes be reduced, which may also allow smaller saw dimensions for example a narrower saw that can more easily pass through restricted openings. Smaller dimensions may also permit use of larger engines with more horsepower, for a given size of equipment, which may translate into better operation and sometimes faster turnaround times. Additionally, by separating the support function from the drive function, driving the load may sometimes be more efficient, which may translate to more horsepower being applied to the load or work piece. Furthermore, manufacturers may be given more flexibility in selecting materials and components for the various parts of the assembly.

Once assembled on an engine or other motion producing device, for example an engine of a saw, the sheave 112 is coupled to and rotates with the drive element 68, and therefore the crank shaft. The bell housing, mounted to the engine block, and therefore the housing tube 108 is stationary relative to the engine block and the sheave is supported by the bearings on the housing tube 108. The drive shaft 82 extends along the axis 100 and housing tube is coaxial with the drive shaft. The sheave 112 rotates with the drive shaft about the axis 100 while being supported by the housing tube, through which the drive shaft 82 extends. The coupler transfers the rotational motion of the drive shaft 82 into rotational motion in the sheave 112.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A saw comprising:
   an engine including a rotatable output shaft;
   a support having a support surface and a tube stationary relative to the engine and extending from the support surface about part of the output shaft;
   an output element having an interior and being supported by the tube and rotatable about the tube;
   a coupling element having a coupling surface within the interior contacting the output shaft within the interior for coupling the output shaft to the output element and wherein the coupling surface on the coupling element includes splines;
   a cutting blade coupled to the output element
   an engagement area between the coupling surface and the shaft wherein the engagement area extends a distance less than an axial length of the coupling element; and
   wherein the output element includes a plurality of belt grooves, one of which is an outer-most groove having an inside face, and wherein the coupling element splines extend inwardly toward the engine no further than the inside face of the outer-most belt groove.

2. A concrete saw comprising:
   an engine including a rotatable output shaft;
   a tube supported by and stationary relative to the engine and extending about part of the output shaft;
   an output element having an outer-most belt support element and being supported by the tube and rotatable about the tube;
   a coupling element having a shaft coupling portion coupling the output shaft to the output element wherein the shaft coupling portion does not extend inboard of the outer-most belt support element; and a cutting blade coupled to the output element.

3. The saw of claim 2 wherein the engine includes a bell housing and the tube is mounted to the bell housing.

4. The saw of claim 2 wherein the tube includes a counter bore around part of the shaft coupling portion of the coupling element.

5. The saw of claim 2 wherein the output element includes multiple belt support elements for supporting one or more belts.

6. The saw of claim 2 wherein the output element is supported by multiple bearing assemblies.

7. The saw of claim 6 the multiple bearing assemblies includes an outer-most bearing assembly having an inner-most surface and the shaft coupling portion does not extend in board toward the engine beyond the inner-most surface.

8. The saw of claim 7 wherein the tube includes a counter bore that does not extend in board beyond the inner-most surface of the outer-most bearing assembly.

9. The saw of claim 3 wherein the output element includes a transmission drive support surface and a transmission drive belt extends about the transmission drive support surface for powering a saw drive transmission.

10. The saw of claim 3 wherein the coupling element includes a plate portion extending a first distance axially and the shaft coupling portion extends a second distance axially greater than the first distance.

11. The saw of claim 10 including fasteners extending through the plate portion and the engaging the output element.

12. The saw of claim 11 wherein the fasteners extend axially.

13. The saw of claim 10 further including a fastener extending axially through the coupling element and engaging the shaft.

14. A saw comprising:

an engine including a rotatable output shaft;

a support having a support surface and a tube stationary relative to the engine and extending from the support surface about part of the output shaft;

an output element supported by the tube and rotatable about the tube;

a splined coupling element for coupling the output shaft to the output element;

a cutting blade coupled to the output element; and at least two bearing assemblies one of which is an outer-most bearing assembly between the tube and the output element and wherein the splines do not pass in board toward the engine beyond the outer-most bearing assembly.

15. A concrete saw comprising:

an engine including a rotatable output shaft;

a support surface stationary relative to the engine and extending adjacent part of the output shaft;

an output element having an outer-most drive support element and being supported by the support surface and movable about the support surface;

a coupling element having a shaft coupling portion coupling the output shaft to the output element wherein the shaft coupling portion does not extend inboard of the outer-most drive support element; and a cutting blade coupled to the output element.

16. The saw of claim 15 wherein the support surface includes a bell housing and a tube attached to the bell housing.

17. The saw of claim 15 wherein the support surface is supported by the engine.

18. The saw of claim 17 wherein the support surface includes a surface allowing the output element to move on the support surface.

19. The saw of claim 18 wherein the support surface includes a round surface.

20. The saw of claim 19 wherein the support surface is a tube.

21. The saw of claim 20 wherein the tube extends around the shaft.

22. The saw of claim 21 wherein the tube extends along the shaft to a point adjacent an end of the shaft.

23. The saw of claim 22 wherein the tube supports the outer-most drive support element.

24. The saw of claim 23 further including bearings between the tube and the outer-most drive support element.

25. The saw of claim 15 wherein the output element includes a belt driven surface for receiving a belt for driving the blade.

26. The saw of claim 25 wherein the outer-most drive support element includes a sheave for receiving a drive belt.

27. The saw of wherein claim 15 the shaft coupling portion on the coupling element extends in-board of part of the support surface.

28. The saw of claim 27 wherein the support surface includes a tube and wherein the shaft coupling portion extends inside part of the tube.

29. The saw of claim 27 wherein the shaft coupling portion includes splines and wherein the splines extend in-board of part of the support surface.

30. The saw of claim 27 wherein the coupling element further includes an output element coupling portion, and wherein the output element coupling portion extends at least partly radially outward of the shaft coupling portion.

31. The saw of claim 30 wherein the output element coupling portion includes a plate for mounting the output element coupling portion to the output element.

32. The saw of claim 31 wherein the plate includes recesses for receiving fasteners for mounting the output element coupling portion to the output element.

33. The saw of claim 30 wherein the output element coupling portion includes an axially positioned outer surface that is an axially outermost surface relative to the output element and to the shaft.

34. The saw of claim 30 wherein the shaft has an end surface that is inboard of the coupling element.

35. The saw of claim 30 wherein the output element has an end surface that is inboard of the output element coupling portion.

36. The saw of claim 15 wherein the shaft has an end surface that is inboard of the coupling element.

37. The saw of claim 36 wherein the coupling element includes an output element coupling portion that is axially outward of the output element.

38. The saw of claim 36 the support surface includes a tube and wherein the shaft coupling portion includes a surface that extends at least partly within the tube.

39. The saw of claim 38 wherein the shaft coupling portion extends between the shaft and the tube.

40. The saw of claim 39 wherein the shaft coupling portion includes splines.

41. The saw of claim 38 wherein the output element extends over the tube and wherein the coupling element includes means for securing the coupling element to the output element.

42. The saw of claim 41 wherein the securing means includes a portion extending into the output element.

43. The saw of claim 15 wherein the shaft includes splines and the coupling element includes splines engaging the shaft splines.

44. The saw of claim 43 wherein the coupling element splines extend inboard no further than the outer-most drive support element.

45. The saw of claim 44 wherein the coupling element includes a plate for coupling the coupling element to the output element.

46. The saw of claim 45 wherein the plate includes an opening for mounting the coupling element to the output element and an opening for mounting the coupling element to the shaft.

47. The saw of claim 46 wherein the plate includes recesses for receiving fasteners.

48. A concrete saw comprising:
   an engine including a rotatable output shaft;
   a support surface stationary relative to the engine and extending adjacent part of the output shaft;
   an output element having an outer-most drive support element and being supported by the support surface and movable about the support surface;
   means for coupling the output shaft to the output element wherein the coupling means does not extend inboard of the outer-most drive support element; and
   a cutting blade coupled to the output element.

49. The saw of claim 48 wherein the coupling means includes splines.

50. The saw of claim 49 wherein the output shaft includes splines engaging the splines on the coupling means.

51. The saw of claim 48 wherein the coupling means further includes an radially extending portion for engaging the output element.

52. The saw of claim 51 wherein the radially extending portion includes a plate for coupling to the output element.

53. The saw of claim 48 wherein the support surface includes a tube for supporting the output element and wherein the coupling means includes a portion extending within the tube.

54. The saw of claim 53 wherein the portion extending within the tube includes splines.

55. The saw of claim 53 wherein the coupling means includes means for engaging the output element.

56. The saw of claim 55 wherein the engaging means includes means for receiving fasteners.

57. The saw of claim 56 wherein the fastener receiving means includes recessed surfaces.

* * * * *